United States Patent
Bennett et al.

(10) Patent No.: US 11,906,771 B2
(45) Date of Patent: Feb. 20, 2024

(54) LONG LENGTH UNIFORM ILLUMINATION LIGHT DIFFUSING FIBER

(71) Applicant: CORNING INCORPORATED, Corning, NY (US)

(72) Inventors: Kevin Wallace Bennett, Hammondsport, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 262 days.

(21) Appl. No.: 17/312,180

(22) PCT Filed: Dec. 9, 2019

(86) PCT No.: PCT/US2019/065163
§ 371 (c)(1),
(2) Date: Jun. 9, 2021

(87) PCT Pub. No.: WO2020/131449
PCT Pub. Date: Jun. 25, 2020

(65) Prior Publication Data
US 2022/0011493 A1 Jan. 13, 2022

Related U.S. Application Data (60) Provisional application No. 62/782,078, filed on Dec. 19, 2018.

(51) Int. Cl.
*C03C 25/106* (2018.01)
*F21V 8/00* (2006.01)
(Continued)

(52) U.S. Cl.
CPC ............ *G02B 6/001* (2013.01); *C03B 37/025* (2013.01); *C03C 25/105* (2013.01);
(Continued)

(58) Field of Classification Search
CPC ................ G02B 6/001; G02B 6/02395; G02B 6/03694; G02B 6/02
See application file for complete search history.

(56) References Cited

U.S. PATENT DOCUMENTS 8,582,943 B2 11/2013 Alkemper et al.
RE46,098 E * 8/2016 Bickham ............... C03C 25/105
(Continued)

FOREIGN PATENT DOCUMENTS

EP 0676218 A1 * 10/1995
NO 2013/095981 A1 6/2013
(Continued)

OTHER PUBLICATIONS

Bock et al., "Enhancing Signal Quality of Evanescent-Wave Multimode Fiber Optic Sensor Using Diffuse Excitation Light", In 8th International Conference on Electronic Packaging Technology, 2007, 15 pages.
(Continued)

*Primary Examiner* — Fatima N Farokhrooz
(74) *Attorney, Agent, or Firm* — Svetlana Short (57) ABSTRACT

Embodiments of the disclosure relates to a light-diffusing element. The light diffusing element includes a glass core having a first refractive index. The light diffusing element also includes a cladding surrounding the glass core. The cladding includes an inner cladding surface and an outer cladding surface. The inner cladding surface and the outer cladding surface define a cladding thickness of from 5 μm to 30 μm. The cladding has a second refractive index that is less than the first refractive index of the glass core. The light diffusing element also includes a coating surrounding the cladding. The coating has an inner coating surface and an outer coating surface. The inner coating surface contacts the outer cladding surface. The outer coating surface defines an
(Continued)

outermost surface of the light-diffusing element, and the coating includes first scattering centers.

43 Claims, 1 Drawing Sheet

(51) Int. Cl.
    *C03C 25/47*     (2018.01)
    *C03B 37/025*     (2006.01)
    *C03C 25/105*     (2018.01)
    *C03C 25/285*     (2018.01)

(52) U.S. Cl.
    CPC .......... *C03C 25/106* (2013.01); *C03C 25/285* (2013.01); *C03C 25/47* (2018.01)

(56) References Cited

U.S. PATENT DOCUMENTS

| | | | |
|---|---|---|---|
| 9,851,500 B2 | 12/2017 | Logunov | |
| 2014/0355295 A1* | 12/2014 | Kuchinisky | G02B 6/001 362/558 |
| 2016/0238784 A1* | 8/2016 | Logunov | G02B 6/02366 |

FOREIGN PATENT DOCUMENTS

| | | |
|---|---|---|
| WO | 2010/011299 A2 | 1/2010 |
| WO | 2013/095982 A1 | 6/2013 |
| WO | 2014/121172 A2 | 8/2014 |
| WO | 2016/126899 A1 | 8/2016 |
| WO | 2017/091528 A2 | 6/2017 |
| WO | 2019/083920 A1 | 5/2019 |
| WO | 2019/143647 A1 | 7/2019 |
| WO | 2020/030980 A1 | 2/2020 |

OTHER PUBLICATIONS

Endruweit et al., "Spectroscopic experiments regarding the efficiency of side emission optical fibres in the UV-A and visible blue spectrum", In Optics and Lasers in Engineering, Elsevier, Amsterdam, NL, vol. 46, No. 2, Oct. 24, 2007, pp. 97-105.

International Search Report and Written Opinion of the International Searching Authority; PCT/US2019/065163; dated Apr. 1, 2020; 10 pages; European Patent Office.

* cited by examiner

LONG LENGTH UNIFORM ILLUMINATION LIGHT DIFFUSING FIBER

CROSS-REFERENCE TO RELATED APPLICATIONS

This application is a national stage application under 35 U.S.C. § 371 of International Application No. PCT/US2019/065163 filed on Dec. 9, 2019, which claims the benefit of priority under 35 U.S.C. § 119 of U.S. Provisional Application Ser. No. 62/782,078 filed on Dec. 19, 2018 the content of which is relied upon and incorporated herein by reference in its entirety.

BACKGROUND

The disclosure relates generally to light diffusing optical fibers, and specifically to a light diffusing optical fiber having uniform illumination over a long length (e.g., at least 30 m). Light-diffusing fibers scatter light radially along the longitudinal axis of the fiber. In some light-diffusing fibers, the light is scattered by voids (e.g., bubbles or airlines) along the length of the light-diffusing fiber. Such fibers uniformly diffuse light over short distances, but these fibers are unable to provide uniform illumination over long distances.

SUMMARY

One embodiment of the disclosure relates to a light-diffusing element. The light diffusing element includes a glass core having a first refractive index and having an outer surface. The light diffusing element also includes a cladding surrounding the glass core. The cladding includes an inner cladding surface and an outer cladding surface. The inner cladding surface contacts the outer surface of the glass core. The inner cladding surface and the outer cladding surface define a cladding thickness of from 5 μm to 30 μm. The cladding has a second refractive index that is less than the first refractive index of the glass core. The light diffusing element also includes a coating surrounding the cladding. The coating has an inner coating surface and an outer coating surface. The inner coating surface contacts the outer cladding surface. The outer coating surface defines an outermost surface of the light-diffusing element, and the coating includes first scattering centers.

An additional embodiment of the disclosure relates to a method for forming a light-diffusing element. In the method, a glass core is formed. A cladding having a thickness of 5 μm to 30 μm is formed on the glass core. The cladding has a lower refractive index than the glass core. A coating is formed on the cladding. The coating includes first scattering centers.

An additional embodiment of the disclosure relates to an illumination system. The illumination system includes a light source and a light diffusing element. The light source is configured to produce light in which a portion of the light from the light source has a wavelength from 440 nm to 2000 nm. The light-diffusing element includes a glass core, a cladding, and a coating. The glass core comprises a first refractive index and a longitudinal axis defining a length of at least 30 m. The cladding surrounds the glass core along the longitudinal axis, and the cladding has a second refractive index that is less than the first refractive index of the glass core. The coating surrounds the cladding, and the coating includes first scattering centers. The light source is optically coupled to a light-diffusing element. Further, light from the light source having wavelength of 2000 nm has a first scattering intensity, and light from the light source having a wavelength of 440 nm has a second scattering intensity. In the illumination system, the first scattering intensity is within 5% of the second scattering intensity over a length of at least 30 m of the light-diffusing element.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Embodiments of the present disclosure provide a light diffusing element, such as a light-diffusing optical fiber, having uniform illumination over a long length (e.g., over at least 30 m). Briefly, the light-diffusing optical fiber includes a core, a cladding, and a coating. In general, the core is made of a glass having a first refractive index, and the cladding is made of a glass or a polymer having a second refractive index that is lower than the first refractive index. Rayleigh scattering takes place at the interface of the core and cladding because of the transition from a medium with a higher refractive index to a medium with a lower refractive index, and because Rayleigh scattering is proportional to the fourth root of the wavelength of light ($\lambda^{-4}$), light having a wavelength in the red spectrum often dissipates in the cladding layer faster than light having a wavelength in the blue spectrum. Accordingly, in embodiments of the present disclosure, the cladding thickness is manipulated to capture the evanescent tail of light that undergoes Rayleigh scattering in the core and at the core/cladding interface. In this way, the light diffused from the light-diffusing optical fiber is more uniform because light from across the spectrum passes through the cladding evenly despite the difference in wavelengths across the spectrum (i.e., wavelength dependent scattering is relatively flat over the relevant spectrum). The light passing through the cladding is then scattered in the coating by scattering centers contained in the coating. In this way, the light is also scattered uniformly in all directions.

In other embodiments, the cladding also includes scattering centers, such as nanoparticles. In particular, the scattering centers contained in the cladding and/or coating are not voids (e.g., $SO_2$ bubbles or airlines), which tend to lead to short diffusion lengths. As used herein, the diffusion length of an LDF is the length over which 90% of light that enters the fiber is scattered out from the fiber. Embodiments of the LDF disclosed herein have diffusion lengths of at least 30 m and even up to 100 m. These and other embodiments will be discussed more fully herein, and the embodiments discussed herein are presented by way of illustration and not by way of limitation.

Figure 1:
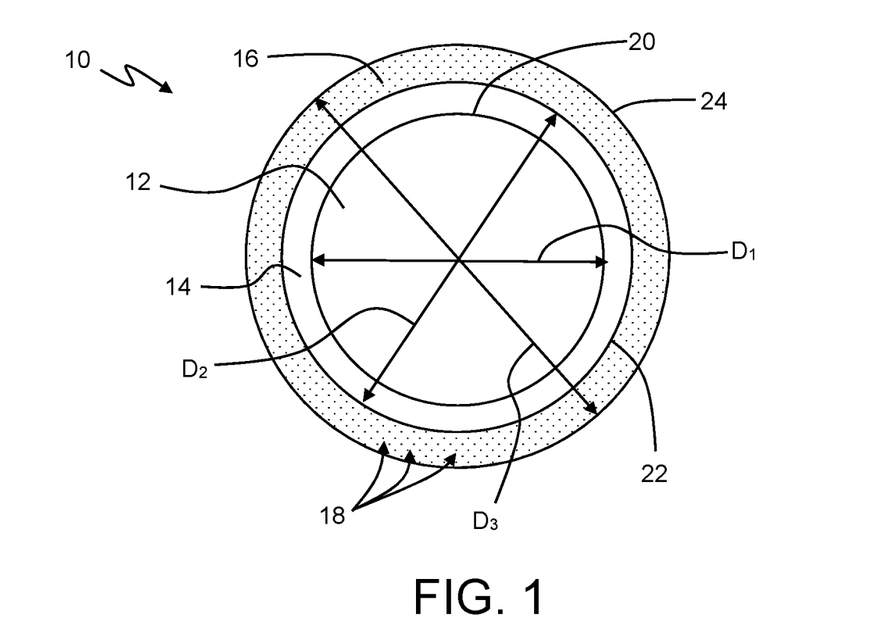
FIG. 1 depicts a cross-sectional view of a light-diffusing optical fiber, according to an exemplary embodiment.
Figure 2:
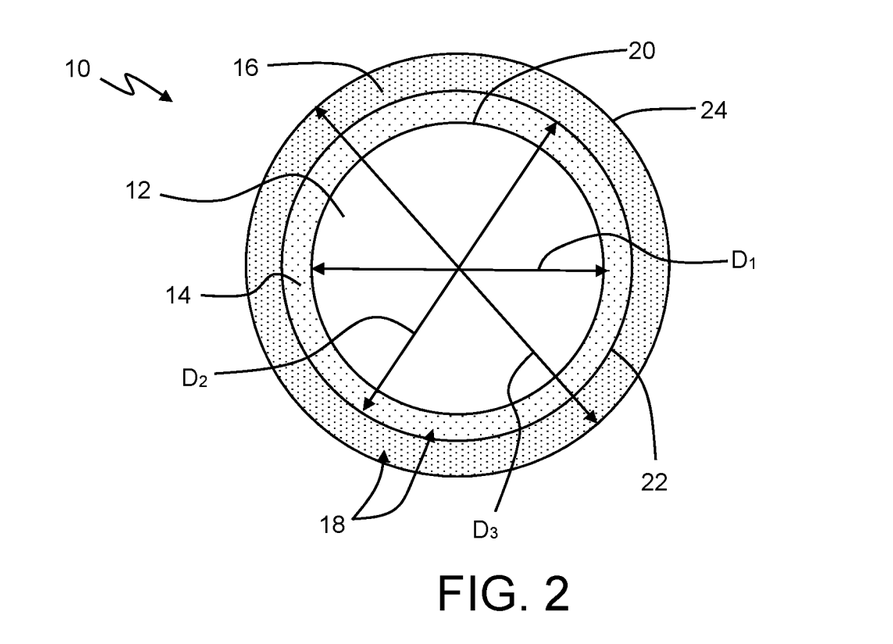
FIG. 2 depicts another cross-sectional view of a light-diffusing optical fiber, according to an exemplary embodiment.

FIG. 1 depicts the cross-section of a light-diffusing optical fiber (LDF) 10 having a circular cross section. The LDF 10 includes a core 12, a cladding 14, and a coating 16. Disposed within the coating 16 are scattering centers 18 that facilitate the uniform diffusion of light from the LDF 10. As shown in FIG. 2, in embodiments, the cladding 14 may also contain scattering centers 18. The cladding 14 is disposed on an outer core surface 20 of the core 12, and the coating 16 is disposed on an outer cladding surface 22 of the cladding 14. In embodiments, an outer coating surface 24 defines the outermost extent (e.g., the radially outermost surface) of the LDF 10. In operation, light supplied from a light source enters the core 12 and is guided through the LDF 10. The direction of propagation of the guided light in the LDF 10 may be referred to herein as the longitudinal or axial direction. The scattering centers 18 effect scattering of light propagating in the LDF 10.

As used herein, scattering refers to a redirection of the propagating light in a direction other than the longitudinal direction. The direction of scattered light may be referred to as an off-axis direction, a lateral direction, or a transverse direction. At least a portion of the scattered light passes the outer coating surface 24 of the LDF 10 and exits LDF 10 to provide an illumination effect. The illumination effect may be broad-array illumination provided, for example, by illumination along all or a portion of the length of the LDF 10.

The outer core surface 20 of core 12 defines a first cross-sectional dimension $D_1$. In embodiments, on average over the length of LDF 10, the cross-sectional dimension $D_1$ of the core 12 may be at least 65 μm, or at least 80 μm, or at least 100 μm, or at least 150 μm, or at least 170 μm, or at least 200 μm, or at least 250 μm, or at least 300 μm, or between 65 μm and 500 μm, or between 100 μm and 400 μm, or between 200 μm and 350 μm, or any subranges therebetween.

The outer cladding surface 22 of cladding 14 defines a second cross-sectional dimension $D_2$. In embodiments, the second cross-sectional dimension $D_2$ is from 5 μm to 20 μm greater than the first cross-sectional dimension $D_1$ regardless of the size of the first cross-sectional dimension $D_1$. Thus, in embodiments, the thickness of cladding 14, i.e., the average distance between the outer core surface 20 and the outer cladding surface 22 along the length of the LDF 10, may be at least 5 μm, or at least 10 μm, or at least 15 μm, or at least 20 μm, or at least 25 μm, or between 5 μm and 30 μm, or between 10 μm and 30 μm, or between 15 μm and 30 μm, or between 20 μm and 30 μm, or between 25 μm and 30 μm, or between 5 μm and 25 μm, or between 5 μm and 20 μm, or between 5 μm and 15 μm, or any subranges therebetween.

In embodiments, the thickness of the cladding 14 is manipulated to adjust the level of red light that is scattered. For example, providing a thinner cladding 14 (e.g., closer to 5 μm) will allow more red light to scatter from the LDF 10, while providing a thicker cladding 14 (e.g., closer to 30 μm) will result in less red light scattering from the LDF 10. In embodiments, for light having a wavelength between 440 nm and 2000 nm entering an LDF 10, the light having wavelength of 2000 nm will have a scattering intensity within 5% of the intensity of light having a wavelength of 440 nm. Additionally, a cladding 14 having a thickness between 5 μm and 30 μm will experience absorption losses of less than 10% in the cladding 14.

In embodiments, the outer coating surface 24 of the coating 16 defines a third cross-sectional dimension $D_3$. In embodiments, the third cross-sectional dimension $D_2$ is from 20 μm to 50 μm greater than the second cross-sectional dimension $D_2$. Thus, in embodiments, the coating 16 surrounding the cladding 14 has a thickness, i.e., the average distance between the outer cladding surface 22 and outer coating surface 24 along the length of the LDF 10, of at least 20 μm, at least 30 μm, at least 40 μm, or at least 50 μm, or between 20 μm and 50 μm, or between 20 μm and 40 μm, or between 20 μm and 30 μm, or between 40 μm and 50 μm, or between 30 μm and 50 μm. In embodiments, the outer coating surface 24 defines an outermost radial extent of the LDF 10 of about 230 μm, about 300 μm, about 400 μm, about 500 μm or about 550 μm.

It should be noted that the LDF 10 also has a length with a length dimension. The length dimension is the dimension along the longitudinal axis of the LDF 10 and the cross-sectional dimension is a direction transverse to the direction of light propagation. In the instance in which the LDF 10 has a rod configuration, for example, the length dimension of the LDF 10 is the dimension along the longitudinal axis, the cross-section may be circular, and the cross-sectional dimension may be the diameter $D_3$ as shown in FIGS. 1 and 2. It is to be understood, however, that the cross-section of the light-diffusing element may be arbitrarily shaped and may include round or flat sides. Shapes of the cross-section may include circle, oval, square, rectangle, and polygon as well as shapes that include a combination of round and flat sides. Thus, as used herein, cross-sectional dimension refers to the longest straight-line distance that connects two points of the outline (e.g. circumference, perimeter) of the cross-section. By way of example: for circular cross-sections, the cross-sectional dimension is the diameter; for elliptical cross-sections, the cross-sectional dimension is the length of the major axis; and for square or rectangular cross-sections, the cross-sectional dimension is the distance between opposite corners. It is further understood that the shape and/or dimensions of the cross-section may be constant or variable along the length dimension of the light-diffusing element. A light-diffusing element having a circular cross-section, for example, may be tapered, where the diameter of the circular cross-section varies along the length of the light-diffusing element.

With respect to the length dimension and as discussed above, the disclosure primarily relates to long LDF 10. Thus, in embodiments, the length of the LDF 10 is at least 30 m. In embodiments, the length of the LDF 10 is from 30 m to 100 m, or from 40 m to 100 m, or from 50 m to 100 m, or from 60 m to 100 m, or from 70 m to 100 m, or from 80 m to 100 m, or from 90 m to 100 m, or from 30 m to 90 m, or from 30 m to 80 m, or from 30 m to 70 m, or from 30 m to 60 m, or from 30 m to 50 m, or from 30 m to 40 m, and all subranges therebetween.

In embodiments, the core 12 is glass, such as silica glass or modified silica glass. In embodiments, the cladding 14 may be glass or a polymer. Glasses for the cladding 14 include silica glass or modified silica glass. Polymers for the cladding 14 include acrylate polymers and/or fluorine-modified polymers. In embodiments, the coating 16 is a polymer, such as an acrylate polymer. In selecting the materials for the core 12 and the cladding 14, the core 12 is selected to have a higher refractive index than the cladding 14. Further, in selecting the material for the coating 16, the material is selected to have a higher refractive index than the cladding 14.

As mentioned briefly above, the difference in refractive indices between the core 12 and cladding 14 allows the core to act as a waveguide and causes Rayleigh scattering in the core and at the core/cladding interface. For an LDF 10, the refractive indices can be considered in terms of the numerical aperture (NA), which is equal to $\sqrt{(n_{core}^2 - n_{clad}^2)}$, with $n_{core} > n_{clad}$. In embodiments, NA is from 0.20 to 0.45, or from 0.25 to 0.45, or from 0.30 to 0.45, or from 0.35 to 0.45, or from 0.40 to 0.45, or from 0.20 to 0.40, or from 0.20 to 0.35, or from 0.20 to 0.30, or from 0.20 to 0.25, or any subranges therebetween. In the spectrum between 400 nm and 2000 nm, the refractive index $n_{core}$ for a silica glass core 12 is about 1.459 at 0.58 µm wavelength. In an embodiment in which the core 12 is silica glass, the composition for the cladding 14 has a refractive index $n_{clad}$ of from about 1.388 to about 1.445 at 0.58 µm wavelength.

In an embodiment, the polymer for the cladding 14 is the cured product of a cladding composition that includes a curable crosslinker, a curable diluent, and a polymerization initiator. The cladding composition may include one or more curable crosslinkers, one or more curable diluents, and/or one or more polymerization initiators. In an embodiment, the curable crosslinker is essentially free of urethane and urea functional groups.

As used herein, the term "curable" is intended to mean that the component, when exposed to a suitable source of curing energy, includes one or more curable functional groups capable of forming covalent bonds that participate in linking the component to itself or to other components to form the polymeric cladding material (i.e., the cured product). The curing process may be induced by radiation or by thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component may include one or more curable functional groups. A curable component with only one curable functional group may be referred to herein as a monofunctional curable component. A curable component having two or more curable functional groups may be referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

In the description of the cladding composition that follows, various components of cladding compositions used to form cladding polymers will be discussed and the amounts of particular components in the cladding composition will be specified in terms of weight percent (wt %) or parts per hundred (pph). The components of the cladding composition include base components and additives. The concentration of base components will be expressed in terms of wt % and the concentration of additives will be expressed in terms of pph.

As used herein, the weight percent of a particular base component refers to the amount of the component present in the cladding composition on a basis that excludes additives. The additive-free cladding composition includes only base components and may be referred to herein as a base composition or base cladding composition. Any crosslinker component(s), diluent component(s), and polymerization initiator(s) present in a cladding composition are regarded individually as base components and collectively as a base composition. The base composition minimally includes a radiation-curable component and a polymerization initiator. The radiation-curable component may be a radiation-curable crosslinker or a radiation-curable diluent. The base composition may, however, include one or more radiation-curable crosslinker components, one or more radiation-curable diluent components, one or more non-radiation-curable components, and one or more polymerization initiators. The collective amount of base components in a cladding composition is regarded herein as equaling 100 weight percent.

Additives are optional and may include one or more of an adhesion promoter, an antioxidant, a catalyst, a carrier or surfactant, a tackifier, a stabilizer, and an optical brightener. Representative additives are described in more detail hereinbelow. The amount of additives introduced into the cladding composition is expressed herein in parts per hundred (pph) relative to the base composition. For example, if 1 g of a particular additive is added to 100 g of base composition, the concentration of additive will be expressed herein as 1 pph.

In one embodiment, the curable crosslinker is a radiation curable component of the cladding composition, and as such it includes one or more functional groups capable of participating in the covalent bonding or crosslinking of the crosslinker into the polymeric cladding material. In one embodiment, the curable crosslinker includes two or more radiation-curable functional groups. Exemplary functional groups capable of participating in the crosslinking include α,β-unsaturated ester, amide, imide or vinyl ether groups.

In one embodiment, the curable crosslinker is essentially free of urethane or urea groups. The curable crosslinker may also be essentially free of thiourethane or thiourea groups. By "essentially free" it is preferable that less than 1 weight percent of the curable crosslinker component includes (thio)urethane or (thio)urea groups. In preferred embodiments, less than 0.5 weight percent of the total curable crosslinker component includes (thio)urethane or (thio)urea groups. In most preferred embodiments, the curable crosslinker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio) components. The present embodiments extend to cladding compositions that include (thio)components with sulfur atom(s) or without sulfur atom(s) in the (thio)functional group as well as compositions that include some (thio) components with sulfur atom(s) and some (thio)components without sulfur atom(s).

In certain embodiments, the curable crosslinker component includes one or more polyols that contain two or more α,β-unsaturated ester, amide, imide, or vinyl ether groups, or combinations thereof. Exemplary classes of these polyol crosslinkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable crosslinker can be a polyether polyol, a polyester polyol, a polycarbonate polyol, or a hydrocarbon polyol.

The curable crosslinker component preferably has a molecular weight of between about 150 g/mol and about 15000 g/mol, in some embodiments more preferably between about 200 g/mol and about 9000 g/mol, in some embodiments preferably between about 1000 g/mol and about 5000 g/mol, in other embodiments preferably between about 200 g/mol and about 1000 g/mol. The curable crosslinker may further have a molecular weight in the range from 100 g/mol to 3000 g/mol, or in the range from 150 g/mol to 2500 g/mol, or in the range from 200 g/mol to 2000 g/mol, or in the range from 500 g/mol to 1500 g/mol.

The curable crosslinker component is present in the cladding composition in an amount of about 1 to about 20 percent by weight, or in an amount of about 2 to about 15 percent by weight, or in an amount of about 3 to about 10 percent by weight.

The curable diluent is a generally lower molecular weight (i.e., about 120 to 600 g/mol) liquid monomer that is added to the formulation to control the viscosity to provide the fluidity needed to apply the coating composition with conventional liquid coating equipment. The curable diluent contains at least one functional group that allows the diluent, upon activation during curing, to link to the polymer formed during the curing process from the curable crosslinker and other curable components. Functional groups that may be present in the curable diluent include, without limitation, acrylate, methacrylate, maleate, fumarate, maleimide, vinyl ether, and acrylamide groups.

To increase the numerical aperture of the fiber and improve coupling efficiency to high numerical aperture light sources, it may be desirable to decrease refractive index of the material used for the cladding 14. This can be done by incorporating fluorinated or partially fluorinated analogs of crosslinkers and/or monomer diluents used in cladding composition. Fluorine-substituted variants of the crosslinkers and monomers diluents can be prepared using methods known in the art.

Monofunctional diluents will contain only a single reactive (curable) functional group, whereas polyfunctional diluents will contain two or more reactive (curable) functional groups. Whereas the former can link to the cladding polymer network during curing, the latter can form crosslinks within the cladding polymer network.

When it is desirable to utilize moisture-resistant components, the diluent component will be selected on the basis of its compatibility with the selected moisture-resistant crosslinker(s) or component(s). Not all such liquid monomers may be successfully blended and copolymerized with the moisture-resistant crosslinker(s) or component(s) because such crosslinker(s) or component(s) are highly non-polar. For satisfactory cladding composition compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomer diluents include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl)isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

It may also be desirable to use certain amounts of monofunctional ethylenically unsaturated monomer diluents, which can be introduced to influence the degree to which the cured product absorbs water, adheres to other cladding composition materials, or behaves under stress. Exemplary monofunctional ethylenically unsaturated monomer diluents include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The curable monomer diluent can include a single diluent component, or combinations of two or more monomer diluent components. The curable monomer diluent(s) is (are collectively) typically present in the cladding composition in amounts of about 10 to about 60 percent by weight, more preferably between about 20 to about 50 percent by weight, and most preferably between about 25 to about 45 percent by weight.

The cladding composition includes a polymerization initiator. The polymerization initiator is a reagent that is suitable to cause polymerization (i.e., curing) of the cladding composition after its application to the core of the light-diffusing element. Polymerization initiators suitable for use in the cladding compositions include thermal initiators, chemical initiators, electron beam initiators, and photoinitiators. Photoinitiators are the preferred polymerization initiators. For most acrylate-based cladding polymer formulations, conventional photoinitiators, such as the known ketonic photoinitiators and/or phosphine oxide photoinitiators, are preferred. When used in the present cladding compositions, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the coating composition. A desirable cure speed is any speed sufficient to cause substantial curing of the coating materials.

Suitable photoinitiators include, without limitation, 1-hydroxycyclohexylphenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucerin TPO available from BASF, Munich, Germany), ethoxy(2,4,6-trimethylbenzoyl)phenyl phosphine oxide (e.g. Lucerin TPO-L from BASF), and combinations thereof.

The polymeric cladding compositions may also include one or more additives. Representative additives include an adhesion promoter, an antioxidant, a catalyst, a carrier or surfactant, a tackifier, a stabilizer, and an optical brightener. Some additives (e.g., catalysts, reactive surfactants, and optical brighteners) may operate to control the polymerization process and may thereby affect the physical properties (e.g., modulus, glass transition temperature) of the cured product formed from the cladding composition. Other additives may influence the integrity of the cured product of the cladding composition (e.g., protect against de-polymerization or oxidative degradation).

An adhesion promoter enhances the adhesion of the cladding 14 to the underlying glass core 12. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference in its entirety. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (e.g. Irganox 1035, available from BASF), 2,6-di-t-butyl-4-methylphenol (BHT). The antioxidant, if present, is used in an amount between about 0.1 pph to about 3 pph, more preferably about 0.25 pph to about 2 pph.

Suitable carriers, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 pph to about 5 pph, more preferably about 0.25 pph to about 3 pph. Other classes of suitable carriers are polyols and non-reactive surfactants. Examples of suitable polyols and non-reactive surfactants include, without limitation, the polyol Acclaim 3201 (poly (ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 pph to about 5 pph, most preferably about 0.1 pph to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-Tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez® series of hydrocarbon tackifiers available from Exxon. For additional information regarding Escorez® tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 pph to about 10 pph, more preferably in the amount between about 0.05 pph to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 pph to about 1 pph, more preferably about 0.01 pph to about 0.2 pph.

Any suitable optical brightener can be employed. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis (styryl)biphenyl compounds. The optical brightener is desirably present in the composition at a concentration of about 0.003 pph to about 0.5 pph, more preferably about 0.005 pph to about 0.3 pph.

Referring now to the coating 16, the coating 16 may be formed from a curable coating composition that includes one or more monomers. The monomers may include ethylenically unsaturated compounds. The curable coating composition may also include one or more oligomers, one or more polymerization initiators, and one or more additives. In one embodiment, the coating 16 is the polymerization product of a coating composition that contains urethane acrylate monomers.

The monomer component of the curable coating composition may include one or more monomers. The one or more monomers may be present in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable coating composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bomyl acrylate, isobornyl acrylate (e.g., SR423, Sartomer Company, Inc.), tetrahydrofiurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N"-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The coating composition may or may not include an oligomeric component. One or more oligomers may be present in the coating composition. One class of oligomers that may be included is ethylenically unsaturated oligomers. When employed, suitable oligomers may be monofunctional oligomers, polyfunctional oligomers, or a combination of a monofunctional oligomer and a polyfunctional oligomer. If present, the oligomer component may include aliphatic and aromatic urethane (meth)acrylate oligomers, urea (meth) acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The coating composition may be free of urethane groups, urethane acrylate compounds, urethane oligomers, or urethane acrylate oligomers.

The oligomeric component of the coating composition may include a difunctional oligomer. A difunctional oligomer may have a structure according to formula (I) below:

$$F_1-R_1[\text{urethane-}R_2\text{-urethane}]_m-R_1-F_1 \qquad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$, where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a poly-functional oligomer. The polyfunctional oligomer may have a structure according to formula (II), formula (III), or formula (IV) set forth below:

$$\text{multiurethane-}(F_2-R_1-F_2)_x \qquad (II)$$

$$\text{polyol-}[(\text{urethane-}R_2\text{-urethane})_m\text{-}R_1-F_2]_x \qquad (III)$$

$$\text{multiurethane-}(R_1-F_2)_x \qquad (IV)$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2O4}-O)_n-$, $-C_{2-12}O-(CO-C_{2-5}O)_n-$, or $-C_{2-12}O-(CO-C_{2-5}NH)_n-$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The coating composition may also contain a polymerization initiator to facilitate polymerization (curing) after application of the coating composition to the cladding. For many acrylate-based coating formulations, photoinitiators, such as the known ketonic photoinitiating and/or phosphine oxide additives, may be used. The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses of about 75 μm may be, for example, less than 1.0 J/cm² or less than 0.5 J/cm².

Suitable photoinitiators for the coating composition may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure,651, BASF); bis(2,4,6-trimethylbenzoyl)phenyl phosphine oxide (e.g., Irgacure 819, BASF); (2,4,6-triethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The protective coating composition may include thiodiethylene bis(3,5-di-tert-butyl)-4-hydroxyhydrocinnamate (e.g., Irganox 1035, available from BASF) as an antioxidant. The protective coating composition may include an acrylated acid adhesion promoter (such as Ebecryl 170 (available from UCB Radcure (Smyrna Ga.)).

In embodiments, the coating 16 has a higher modulus than the cladding polymer material. In embodiments, the coating 16 has a Young's modulus, when configured as a cured rod having a diameter of about 0.022" of at least about 1000 MPa, or at least about 1200 MPa, or at least about 1400 MPa, or at least about 1600 MPa, or at least about 1800 MPa.

Having described the compositions of the core 12, cladding 14, and coating 16, attention will now be turned to exemplary fabrication methods for producing an LDF 10 according to the present disclosure. Glass portions of the LDF 10 may be made by forming a soot-containing optical fiber preform via chemical vapor deposition (CVD), outer vapor deposition (OVD), vapor axial deposition (VAD), flame hydrolysis, flame oxidation, or other techniques known in the art. Dopants can be provided in the glass composition used to make the preform. In particular, the glass core 12 may be doped with elements to increase the refractive index (and thereby increase the NA of the LDF 10), which enhances Rayleigh scattering in the core 12. Exemplary dopants include germanium oxides, titanium oxides, and aluminum oxides, among others. The preform can include a core region and/or a cladding region, where doping may differ in each region.

A soot preform may be formed by depositing silica-containing soot onto an outer surface of a rotating and translating mandrel or bait rod. This process is known as the OVD or outside vapor deposition process. The mandrel is preferably tapered and the soot is formed by providing a glass precursor in gaseous form to the flame of a burner to oxidize it. A fuel, such as methane ($CH_4$) and a supporting combustion gas, such as oxygen, is provided to the burner and ignited to form the flame. Glass former compounds (e.g. $SiCl_4$, octamethylcyclotetrasiloxane) are oxidized in the flame to form a generally cylindrically-shaped soot region on a mandrel or substrate. A dopant compound may be included.

The soot preform may be consolidated in a consolidation furnace to form a consolidated blank. Prior to consolidation, the mandrel is removed to form a hollow, cylindrical soot blank preform. During the consolidation process, the soot preform is suspended, for example, inside a pure quartz muffle tube of the consolidation furnace by a holding mechanism. Preferably, before the consolidation step, the preform is exposed to a drying atmosphere. For example, a suitable drying atmosphere may include about 95% to 99% helium and 1% to 5% chlorine gas at a temperature of between about 950° C. and 1250° C. and a suitable drying time ranges from about 0.5 and 4.0 hours.

During the consolidation step, which preferably takes place after a soot drying step, the furnace temperature is raised and the preform is consolidated at a suitable temperature, for example between about 1390° C. and 1535° C. to form a consolidated preform.

Gradient sintering may be employed whereby the soot preform is driven down through a hot zone of the furnace, which is maintained at a temperature of between about 1225° C. to 1550° C., or between about 1390° C. and 1535° C. For example, the preform may be held in an isothermal zone which is maintained at a desired drying temperature (950-1250° C.), after which the soot preform is driven through a zone which is maintained at a desired consolidation temperature (e.g., between 1225° C. and 1550° C., or between 1390° C. and 1535° C.) at a rate of speed which is sufficient to result in the preform temperature increasing by greater than 1° C./min. Upper zones of the furnace can be maintained at lower temperatures which facilitate a drying and impurity removal step. The lower zone can be maintained at the higher temperatures desired for consolidation.

A polymer cladding 14 can be formed on a glass core 12 (doped or undoped) by applying a cladding composition of the type described hereinabove to the glass core 12 during the process of drawing the core 12 from a preform. The cladding composition is a liquid and can be sprayed, brushed or otherwise applied to the drawn glass core 12. Reaction of the cladding composition provides a polymer cladding 14 on the glass core 12. In one embodiment, the reaction is a photoreaction and polymerization (curing) of the cladding composition occurs upon exposing the applied coating composition to radiation of proper wavelength. The proper wavelength is a wavelength capable of initiating the curing reaction and may be dictated by the choice of photoinitiator used in the cladding composition.

Scattering centers 18, such as nanoparticles, may be incorporated in the polymer cladding 14 by adding the nanoparticles (directly as a solid, in the form of a suspension, or in a solvent) to the cladding composition before applying the cladding composition to the drawn glass core 12. As the curing reaction proceeds and the polymer cladding 14 forms, the nanoparticles become incorporated in the polymer cladding 14. In one embodiment, the nanoparticles are incorporated as a dispersed phase in the polymer cladding 14.

After application of the cladding 14, the coating 16 is applied to the LDF 10. Besides helping to provide uniform scatter of light from the LDF 10, the coating 16 is, in embodiments, designed to protect the LDF 10 from mechanical damage. Scattering centers 18, such as nanoparticles, may be incorporated in the polymer coating 16 by adding the nanoparticles (directly as a solid, in the form of a suspension, or in a solvent) to the coating composition before applying the coating composition to the cladding 14. As the curing reaction proceeds and the coating 16 forms, the nanoparticles become incorporated in the coating 16. In one embodiment, the nanoparticles are incorporated as a dispersed phase in the coating 16.

In embodiments, the coating 16 is formed by applying the coating composition to the cladding 14 and initiating reaction of the coating composition to form the coating 16 on the cladding 14. In one embodiment, the coating 16 is formed by curing a coating composition during draw of a glass preform. When the cladding 14 is a polymer formed by curing a cladding composition, the coating composition may be applied to the cladding composition before or after curing of the cladding composition (wet-on-wet or wet-on-dry configurations).

Scattering centers 18 were generally discussed with respect to the composition and fabrication of the LDF 10, and the following paragraphs provide additional specificity regarding selection and properties of the scattering centers 18 according to various embodiments.

In practice, a distribution of sizes (cross-sectional and/or length dimensions) and shapes for the scattering centers will be present. The size and shape distribution as well as number of scattering centers may vary within a cross-section, in the coating 16 relative to the cladding 14, and/or along the length of the LDF 10.

Scattering centers for the cladding 14 include dopants and nanoparticles. As used herein, "dopants" are elements that are incorporated into a base glass composition to modify the refractive index. Dopants include updopants and downdopants. An updopant is a dopant that raises the refractive index of the base glass composition and a downdopant is a dopant that lowers the refractive index of the base glass composition. In one embodiment, the base glass composition (of the cladding 14) is silica glass. Up-dopants for silica glass include Ge, Al, P, Ti, Cl, and Br. Downdopants for silica glass include F and B. The incorporation of dopants in a glass cladding 14 enhances scattering through the Rayleigh scattering and/or small angle scattering mechanisms. The dopants and/or nanoparticles may be distributed throughout the cross-section of the cladding 14 or localized within one or more discrete regions thereof. The dopants or nanoparticles may be configured in a random or non-periodic arrangement and may have a uniform or non-uniform distribution of size or number.

The scattering centers 18 may have a cross-section with a dimension of at least 30 nm, or at least 50 nm, or at least 100 nm, or at least 250 nm, or at least 500 nm, or at least 1000 nm, or between 30 nm and 40 µm (40,000 nm), or between 100 nm and 40 µm, or between 250 nm and 40 µm, between 500 nm and 20 µm, or between 1000 nm and 10 µm, or between 30 nm and 2000 nm. The scattering centers 18 within the coating 16 and/or cladding 14 may include a distribution of cross-sectional dimensions.

In the cladding 14, the scattering centers 18 (when present) may occupy a fill fraction of from 0.05% to 1% of the cladding 14. In the coating 16, the scattering centers 18 may occupy a fill fraction of between 0.5% and 30%, or between 1% and 15%, or between 2% and 10% of the coating 16. As used herein, fill fraction refers to the fraction of the cross-sectional area occupied by the scattering centers. In one embodiment, the fill fraction is constant along the length of the light-diffusing element. In another embodiment, the fill fraction varies along the length of the light-diffusing element. To a good approximation, the fill fraction corresponds to the volume fraction of scattering centers 18. Thus, the volume fraction of scattering centers 18 within the cladding 14 may be from 0.05% to 1%. The volume fraction of scattering centers 18 within the coating 16 may be at least 0.5%, or at least 1.0%, or at least 2.0%, or at least 5.0%, or between 0.5% and 30%, or between 1.0% and 15%, or between 2.0% and 10%, or between 2.0% and 30%, or between 3.0% and 20%.

The cross-sectional distribution of scattering centers 18 may vary at different positions in the cladding 14 and/or coating 16 along the length of the LDF 10. The variations may also occur in the axial or length direction of the LDF 10.

In embodiments in which the scattering centers 18 are nanoparticles, the nanoparticles are particulate matter having dimensions in the nanoscale regime. In embodiments, the nanoparticles are approximately spherical and the cross-sectional dimension is the diameter of the sphere. In one embodiment, the nanoparticles are oxide nanoparticles. Representative compositions for oxide nanoparticles include $TiO_2$, $ZrO_2$, other transition metal oxides, rare earth oxides, mixed metal oxides (e.g., garnets such as $Y_3Al_5O_{12}$), $SiO_2$, and $Al_2O_3$. Fluoride or chalcogenide nanoparticles may also be used. In one embodiment, the nanoparticles are luminescent (e.g., fluorescent or phosphorescent). Luminescent nanoparticles include oxides that include a light-emitting metal center. Light-emitting metal centers include $Cr^{3+}$, $Ce^{3+}$, $Nd^{3+}$, $Tb^{3+}$, $Eu^{3+}$, and $Pr^{3+}$. Light-emitting metal centers may be incorporated as dopants in otherwise non-luminescent inorganic host lattices (e.g., oxide lattices such as $Y_3Al_5O_{12}$ or $Al_2O_3$). Luminescent nanoparticles also include quantum dots or light-emitting semiconductor materials such as CdS, CdSe, ZnTe, ZnS, or other direct bandgap II-VI or III-V semiconductor materials. Use of light-emitting scattering centers 18 permits control of the color of light emanating from the light-diffusing element. The light-emitting scattering centers 18 in the cladding 14 and/or coating 16 absorb at least a portion of the light scattered from the core and reemit the light at a different wavelength to modify the color of the light. Light-emitting nanoparticles that emit at multiple wavelengths may be incorporated to provide greater control over color to achieve any color, or combinations of colors, in the spectrum (including white light). Inclusion of light-emitting scattering centers 18 avoids the need to apply a separate phosphor coating layer over the LDF 10.

The cladding 14 and coating 16 may include more than one type of scattering center 18. In another embodiment, the cladding 14 is a glass that includes a dopant and nanoparticles, including dopants and nanoparticles of different varieties. In still another embodiment, the cladding 14 is a polymer that includes nanoparticles, including nanoparticles of different varieties. In a further embodiment, the coating 16 is a polymer that includes nanoparticles, including nanoparticles of different varieties. In embodiments, the scattering centers 18 in the cladding 14 and/or coating 16 are selected to have a refractive index within 0.05 of the refractive index of the cladding 14 or coating 16, respectively.

The LDF 10 may be configured to scatter light along all or some of its length by controlling the placement and concentration of the scattering centers 18 in the cladding 14 and/or coating 16. Regions of the LDF 10 that include scattering centers 18 may efficiently scatter light to produce an illumination effect, while regions of the LDF 10 that lack scattering centers 18 may not. As described more fully below, processing conditions may be used to control whether scattering centers 18 form in a particular region of the LDF 10. The LDF 10 may include cross-sections or extended lengths without scattering centers 18 that scatter little or no light along with cross-sections or extended lengths that include scattering centers 18. Regions or cross-sections with and without scattering centers 18 may be interspersed or alternating along the length of the LDF 10.

The brightness of the LDF 10 as an illumination source depends on the intensity of scattered light that passes through the outer coating surface 24. The intensity of scattered light depends on the scattering loss of light propagating through the LDF 10. As used herein, scattering loss refers to light directed outside of the LDF 10 by the combined scattering of the cladding 14 and coating 16. A higher scattering loss leads to a greater intensity of scattered light per unit length of the LDF 10 and increases the brightness of the LDF 10. The scattering loss of the LDF 10 may be at least 0.2 dB/m, or at least 0.5 dB/m, or at least 1 dB/m, or at least 2 dB/m, or at least 5 dB/m, or at least 10 dB/m.

As provided herein, the disclosure is directed, at least in part, to providing uniformity in illumination intensity along the length of a long (e.g., >30 m) LDF 10 or selected regions thereof. The intensity of scattered light that passes through the outer coating surface 24 of the element may have a maximum value. The variation in the intensity of the scattered light that passes through the outer coating surface 24 of the element may vary by less than 50% of the maximum value along the length of the element or selected portions thereof at the illumination wavelength, or less than 30% of the maximum value along the length of the element or selected portions thereof at the illumination wavelength, or less than 20% of the maximum value along the length of the element or selected portions thereof at the illumination wavelength.

The scattering efficiency may vary along the length of the LDF 10. It may be desirable to control the degree of variation of scattering of the illumination wavelength along the length of the LDF 10 or selected portions thereof to achieve a more uniform illumination effect. The scattering efficiency may be different near the source end of the LDF 10 relative to near the delivery end of the LDF 10. The scattering efficiency may increase along the LDF 10 with increasing distance from the source end of the element. Higher scattering efficiency at positions more distant from the source act to preserve illumination intensity by compensating for losses in the intensity of source light with increasing distance from the source. As light propagates away from the source in the LDF 10, it scatters and its intensity progressively decreases. To maintain brightness, the LDF 10 can be configured to provide an increasing scattering efficiency as the intensity of source light diminishes with increasing distance from the source. Scattering efficiency can be controlled, for example, by varying the concentration, size and/or composition of scattering centers 18 along the length of the LDF 10.

The scattering efficiency along the length of the LDF 10 may have a maximum value. The scattering efficiency at the illumination wavelength along the length of the light-diffusing element or selected portions thereof may vary by less than 50% of the maximum value, or less than 30% of the maximum value, or less than 20% of the maximum value. The stated variations in scattering efficiency, scattered light intensity, and/or the stated scattering losses may be simultaneously realized in the LDF 10.

The LDF 10 may be incorporated in an illumination system that includes a light source. The light source may be a lamp, diode, laser, laser diode, LED (light-emitting diode) or other source. The light source may operate over all or part of the spectral range from 200 nm to 2000 nm. To insure efficient coupling of the light source to the light-diffusing element, it is desirable to insure that the $NA_{LDF}$ of the LDF 10 is comparable to or exceeds the $NA_{light}$ of the light source. As discussed above, the $NA_{LDF}$ of the LDF 10 is controlled by the relative refractive indices of the core 12 and cladding 14. The numerical aperture of the light-diffusing element can be increased by increasing the refractive index of the core and/or decreasing the refractive index of the cladding. The refractive index $n_{clad}$ of the cladding 14 can be reduced by incorporating scattering centers in the cladding 14, employing polymer cladding 14 instead of silica glass cladding 14, and using fluorinated versions of cladding polymer materials.

The LDF 10 in accordance with the present disclosure may be deployed in illumination systems, as light sources (e.g. for photochemical reactions, cooling spaces, heating spaces, or closed spaces with controlled environments), and as luminaires. The LDF 10 are suitable for functional and decorative lighting applications.

Aspect (1) pertains to a light-diffusing element comprising: a glass core comprising a first refractive index and an outer surface; a cladding surrounding the glass core, the cladding comprising an inner cladding surface and an outer cladding surface, wherein the inner cladding surface contacts the outer surface of the glass core, wherein the inner cladding surface and the outer cladding surface define a cladding thickness of from 5 µm to 30 µm, and wherein the cladding has a second refractive index that is less than the first refractive index of the glass core; and a coating surrounding the cladding, the coating comprising an inner coating surface and an outer coating surface, wherein the inner coating surface contacts the outer cladding surface and the outer coating surface defines an outermost surface of the light-diffusing element and wherein the coating includes first scattering centers.

Aspect (2) pertains to the light-diffusing element of Aspect (1), wherein the glass core comprises silica glass.

Aspect (3) pertains to the light-diffusing element of Aspect (1) or Aspect (2), wherein a numerical aperture of the first refractive index and the second refractive index is from 0.2 to 0.45.

Aspect (4) pertains to the light-diffusing element of any one of Aspects (1) through (3), wherein the glass core has a diameter of from 65 µm to 500 µm Aspect (5) pertains to the light-diffusing element of any one of Aspects (1) through (4), wherein the inner coating surface and the outer coating surface define a thickness of from 20 µm to 50 µm.

Aspect (6) pertains to the light-diffusing element of any one of Aspects (1) through (5), wherein the coating has a third refractive index and wherein the third refractive index is greater than the second refractive index.

Aspect (7) pertains to the light-diffusing element of any one of Aspects (1) through (6), wherein the first scattering centers have an average particle size of 30 nm to 2000 nm and wherein the first scattering centers have a fourth refractive index that is different from a third refractive index of the coating by at least 0.05.

Aspect (8) pertains to the light-diffusing element of any one of Aspects (1) through (7), wherein the first scattering centers comprise at least one of $TiO_2$, $Al_2O_3$, or $ZrO_2$.

Aspect (9) pertains to the light-diffusing element of any one of Aspects (1) through (8), wherein the concentration of the first scattering centers in the coating is at least 1% by volume.

Aspect (10) pertains to the light-diffusing element of any one of Aspects (1) through (9), wherein the cladding comprises no voids or airlines.

Aspect (11) pertains to the light-diffusing element of any one of Aspects (1) through (10), wherein the light-diffusing element has a diffusion length of at least 30 m.

Aspect (12) pertains to the light-diffusing element of any one of Aspects (1) through (11), wherein the coating is comprised of acrylic polymer.

Aspect (13) pertains to the light-diffusing element of any one of Aspects (1) through (12), wherein the cladding comprises a polymer.

Aspect (14) pertains to the light-diffusing element of Aspect (13), wherein the polymer comprises fluorine.

Aspect (15) pertains to the light-diffusing element of any one of Aspects (1) through (14), wherein the cladding includes second scattering centers.

Aspect (16) pertains to the light-diffusing element of claim 15, wherein the second scattering centers comprise at least one of $TiO_2$, $Al_2O_3$, or $ZrO_2$.

Aspect (17) pertains to the light-diffusing element of Aspect (15) or (16), wherein the second scattering centers have a particle size in the range of from 30 nm to 2000 nm.

Aspect (18) pertains to the light-diffusing element of any one of Aspects (15) through (17), wherein the concentration of the second scattering centers in the cladding is from 0.05% to 1% by volume.

Aspect (19) pertains to the light-diffusing element of any one of Aspects (1) through (18), wherein the outer coating surface defines a maximum outer diameter of the light-diffusing element of 230 µm.

Aspect (20) pertains to the light-diffusing element of any one of Aspects (1) through (19), wherein the light-diffusing element has a length of at least 50 m over which light scattering is at least 0.2 dB/m.

Aspect (21) pertains to the light-diffusing element of any one of Aspects (1) through (20), wherein light having wavelength of 2000 nm has a first scattering intensity, wherein light having a wavelength of 440 nm has a second scattering intensity, and wherein the first scattering intensity is within 5% of the second scattering intensity over a length of at least 50 m of the light-diffusing element.

Aspect (22) pertains to the light-diffusing element of any one of Aspects (1) through (21), wherein the light-diffusing element has absorption losses of less than 10% in the cladding.

Aspect (23) pertains to an illumination system comprising a light source optically coupled to a light-diffusing element according to one of Aspects (1) through (22).

Aspect (24) pertains to the illumination system of Aspect (23), wherein the light source comprises at least one of a lamp, a diode, a laser, a laser diode, or an LED.

Aspect (25) pertains to a method for forming a light-diffusing element comprising: forming a glass core; forming a cladding having a thickness of 5 µm to 30 µm on the glass core, the cladding having a lower refractive index than the glass core; and forming a coating on the cladding, the coating including first scattering centers.

Aspect (26) pertains to the method of Aspect (25), wherein the step of forming the glass core includes drawing a glass preform.

Aspect (27) pertains to the method of Aspect (25) or Aspect (26), wherein the step of forming the cladding includes applying a curable composition to said core and curing said curable composition.

Aspect (28) pertains to the method of Aspect (27), wherein the step of forming the cladding includes curing the curable composition in a manner that avoids the formation of voids.

Aspect (29) pertains to the method of any one of Aspects (25) through (28), wherein the first scattering centers comprise $TiO_2$ dispersed in acrylic polymer.

Aspect (30) pertains to the method of any one of Aspects (25) through (29), wherein the step of forming the cladding further comprises dispersing second scattering centers comprising at least one of $TiO_2$, $Al_2O_3$, or $ZrO_2$ in the cladding.

Aspect (31) pertains to the method of any one of Aspects (25) through (30), wherein the step of forming the coating further comprises forming the coating such that a thickness of the coating is from 20 µm to 50 µm.

Aspect (32) pertains to the method of any one of Aspects (25) through (31), wherein the step of forming the coating further comprises including the first scattering centers at a concentration of at least 1% by volume.

Aspect (33) pertains to an illumination system comprising: a light source configured to produce light in which a portion of the light from the light source has a wavelength from 440 nm to 2000 nm; and a light-diffusing element comprising: a glass core having a first refractive index and a longitudinal axis defining a length of at least 30 m; a cladding surrounding the glass core along the longitudinal axis, the cladding having a second refractive index that is less than the first refractive index of the glass core; and a coating surrounding the cladding, the coating including first scattering centers; wherein the light source is optically coupled to a light-diffusing element; wherein light from the light source having wavelength of 2000 nm has a first scattering intensity, wherein light from the light source having a wavelength of 440 nm has a second scattering intensity; and wherein the first scattering intensity is within 5% of the second scattering intensity over a length of at least 30 m of the light-diffusing element.

Aspect (34) pertains to the illumination system of Aspect (33), wherein the cladding comprises an inner cladding surface and an outer cladding surface, the inner cladding surface and the outer cladding surface defining a cladding thickness therebetween, wherein the cladding thickness is from 5 µm to 30 µm.

Aspect (35) pertains to the illumination system of Aspect (33) or Aspect (34), wherein the light source comprises at least one of a lamp, a diode, a laser, a laser diode, or an LED.

Aspect (36) pertains to the illumination system of any one of Aspects (33) through (35), wherein the first scattering centers comprise at least one of $TiO_2$, $Al_2O_3$, or $ZrO_2$.

Aspect (37) pertains to the illumination system of any one of Aspects (33) through (36), wherein a numerical aperture of the first refractive index and the second refractive index is from 0.2 to 0.45.

Aspect (38) pertains to the illumination system of any one of Aspects (33) through (37), wherein the concentration of the first scattering centers in the coating is at least 1% by volume.

Aspect (39) pertains to the illumination system of any one of Aspects (33) through (38), wherein the cladding comprises a polymer.

Aspect (40) pertains to the illumination system of Aspect (39), wherein the polymer comprises fluorine.

Aspect (41) pertains to the illumination system of any one of Aspects (33) through (40), wherein the cladding includes second scattering centers.

Aspect (42) pertains to the illumination system of Aspect (41), wherein the second scattering centers comprise at least one of $TiO_2$, $Al_2O_3$, or $ZrO_2$.

Aspect (43) pertains to the illumination system of Aspect (41) or (42), wherein the concentration of the second scattering centers in the cladding is from 0.05% to 1% by volume.

Aspect (44) pertains to the illumination system of any one of Aspects (33) through (43), wherein the light-diffusing element has absorption losses of less than 10% in the cladding.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A light-diffusing element comprising:
   a glass core comprising a first refractive index and an outer surface;
   a cladding surrounding the glass core, the cladding comprising an inner cladding surface and an outer cladding surface, wherein the inner cladding surface contacts the outer surface of the glass core, wherein the inner cladding surface and the outer cladding surface define a cladding thickness of from 5 μm to 30 μm, and wherein the cladding has a second refractive index that is less than the first refractive index of the glass core; and
   a coating surrounding the cladding, the coating comprising an inner coating surface and an outer coating surface, wherein the inner coating surface contacts the outer cladding surface and the outer coating surface defines an outermost surface of the light-diffusing element and wherein the coating includes first scattering centers;
   wherein light having wavelength of 2000 nm has a first scattering intensity, wherein light having a wavelength of 440 nm has a second scattering intensity, and wherein the first scattering intensity is within 5% of the second scattering intensity over a length of at least 50 m of the light-diffusing element.

2. The light-diffusing element of claim 1, wherein the glass core comprises silica glass.

3. The light-diffusing element of claim 1, wherein a numerical aperture as calculated based on the first refractive index and the second refractive index is from 0.2 to 0.45.

4. The light-diffusing element of claim 1, wherein the glass core has a diameter of from 65 μm to 500 μm.

5. The light-diffusing element of claim 1, wherein the inner coating surface and the outer coating surface define a thickness of from 20 μm to 50 μm.

6. The light-diffusing element of claim 1, wherein the coating has a third refractive index and wherein the third refractive index is greater than the second refractive index.

7. The light-diffusing element of claim 1, wherein the first scattering centers comprise at least one of $TiO_2$, $Al_2O_3$, or $ZrO_2$.

8. The light-diffusing element of claim 1, wherein the concentration of the first scattering centers in the coating is at least 1% by volume.

9. The light-diffusing element of claim 1, wherein the cladding comprises no voids or airlines.

10. The light-diffusing element of claim 1, wherein the light-diffusing element has a diffusion length of at least 30 m.

11. The light-diffusing element of claim 1, wherein the coating is comprised of acrylic polymer.

12. The light-diffusing element of claim 1, wherein the cladding comprises a polymer.

13. The light-diffusing element of claim 1, wherein the cladding includes second scattering centers.

14. The light-diffusing element of claim 1, wherein the outer coating surface defines a maximum outer diameter of the light-diffusing element of 230 μm.

15. The light-diffusing element of claim 1, wherein the light-diffusing element has a length of at least 50 m over which light scattering is at least 0.2 dB/m.

16. The light-diffusing element of claim 1, wherein the light-diffusing element has absorption losses of less than 10% in the cladding.

17. An illumination system comprising a light source optically coupled to a light-diffusing element according to claim 1.

18. The light-diffusing element of claim 6, wherein the first scattering centers have an average particle size of 30 nm to 2000 nm and wherein the first scattering centers have a fourth refractive index that is different from a third refractive index of the coating by at least 0.05.

19. The light-diffusing of claim 12, wherein the polymer comprises fluorine.

20. The light-diffusing element of claim 13, wherein the second scattering centers comprise at least one of $TiO_2$, $Al_2O_3$, or $ZrO_2$.

21. The light-diffusing element of claim 13, wherein the second scattering centers have a particle size in the range of from 30 nm to 2000 nm.

22. The light-diffusing element of claim 13, wherein the concentration of the second scattering centers in the cladding is from 0.05% to 1% by volume.

23. The illumination system of claim 17, wherein the light source comprises at least one of a lamp, a diode, a laser, a laser diode, or an LED.

24. A method for forming a light-diffusing element comprising:
   forming a glass core;
   forming a cladding having a thickness of 5 μm to 30 μm on the glass core, the cladding having a lower refractive index than the glass core; and
   forming a coating on the cladding, the coating including first scattering centers;
   wherein light having wavelength of 2000 nm has a first scattering intensity, wherein light having a wavelength of 440 nm has a second scattering intensity, and wherein the first scattering intensity is within 5% of the second scattering intensity over a length of at least 50 m of the light-diffusing element.

25. The method of claim 24, wherein the step of forming the glass core includes drawing a glass preform.

26. The method of claim 24, wherein the step of forming the cladding includes applying a curable composition to said core and curing said curable composition.

27. The method of claim 24, wherein the first scattering centers comprise $TiO_2$ dispersed in acrylic polymer.

28. The method of claim 24, wherein the step of forming the cladding further comprises dispersing second scattering centers comprising at least one of $TiO_2$, $Al_2O_3$, or $ZrO_2$ in the cladding.

29. The method of claim 24, wherein the step of forming the coating further comprises forming the coating such that a thickness of the coating is from 20 μm to 50 μm.

30. The method of claim 24, wherein the step of forming the coating further comprises including the first scattering centers at a concentration of at least 1% by volume.

31. The method of claim 26, wherein the step of forming the cladding includes curing the curable composition in a manner that avoids the formation of voids.

32. An illumination system comprising:
   a light source configured to produce light in which a portion of the light from the light source has a wavelength from 440 nm to 2000 nm; and
   a light-diffusing element comprising:
      a glass core having a first refractive index and a longitudinal axis defining a length of at least 30 m;
      a cladding surrounding the glass core along the longitudinal axis, the cladding having a second refractive index that is less than the first refractive index of the glass core; and a coating surrounding the cladding, the coating including first scattering centers;

wherein the light source is optically coupled to a light-diffusing element;

wherein light from the light source having wavelength of 2000 nm has a first scattering intensity, wherein light from the light source having a wavelength of 440 nm has a second scattering intensity; and wherein the first scattering intensity is within 5% of the second scattering intensity over a length of at least 30 m of the light-diffusing element.

33. The illumination system of claim 32, wherein the cladding comprises an inner cladding surface and an outer cladding surface, the inner cladding surface and the outer cladding surface defining a cladding thickness therebetween, wherein the cladding thickness is from 5 µm to 30 µm.

34. The illumination system of claim 32, wherein the light source comprises at least one of a lamp, a diode, a laser, a laser diode, or an LED.

35. The illumination system of claim 32, wherein the first scattering centers comprise at least one of $TiO_2$, $Al_2O_3$, or $ZrO_2$.

36. The illumination system of claim 32, wherein a numerical aperture as calculated based on the first refractive index and the second refractive index is from 0.2 to 0.45.

37. The illumination system of claim 32, wherein the concentration of the first scattering centers in the coating is at least 1% by volume.

38. The illumination system of claim 32, wherein the cladding comprises a polymer.

39. The illumination system of claim 32, wherein the cladding includes second scattering centers.

40. The illumination system of claim 32, wherein the light-diffusing element has absorption losses of less than 10% in the cladding.

41. The illumination system of claim 38, wherein the polymer comprises fluorine.

42. The illumination system of claim 39, wherein the second scattering centers comprise at least one of $TiO_2$, $Al_2O_3$, or $ZrO_2$.

43. The illumination system of claim 39, wherein the concentration of the second scattering centers in the cladding is from 0.05% to 1% by volume.

* * * * *

UNITED STATES PATENT AND TRADEMARK OFFICE
CERTIFICATE OF CORRECTION

PATENT NO. : 11,906,771 B2  
APPLICATION NO. : 17/312180  
DATED : February 20, 2024  
INVENTOR(S) : Kevin Wallace Bennett et al.

Page 1 of 1

It is certified that error appears in the above-identified patent and that said Letters Patent is hereby corrected as shown below:

On the Title Page

Item (56), in Column 2, under "Foreign Patent Documents", Line 2, delete "NO" and insert -- WO --.

In the Claims

In Column 24, Line 9, in Claim 19, delete "of" and insert -- element of --.

Signed and Sealed this  
Twelfth Day of November, 2024

Katherine Kelly Vidal  
*Director of the United States Patent and Trademark Office*